(12) United States Patent
Oh

(10) Patent No.: US 8,834,279 B2
(45) Date of Patent: Sep. 16, 2014

(54) SHAFT ASSEMBLY FOR A CONSTANT VELOCITY JOINT

(71) Applicant: Dana Automotive Systems Group, LLC, Maumee, OH (US)

(72) Inventor: Seung Tark Oh, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 13/789,968

(22) Filed: Mar. 8, 2013

(65) Prior Publication Data

US 2013/0244798 A1  Sep. 19, 2013

Related U.S. Application Data

(60) Provisional application No. 61/610,676, filed on Mar. 14, 2012.

(51) Int. Cl.
*F16D 3/84* (2006.01)
(52) U.S. Cl.
CPC ............. *F16D 3/843* (2013.01); *Y10S 464/906* (2013.01); *F16D 2300/08* (2013.01); *F16D 3/845* (2013.01)
USPC ................ 464/15; 464/17; 464/173; 464/906
(58) Field of Classification Search
CPC ........... F16D 3/84; F16D 3/843; F16D 3/845; F16D 2300/08; F16J 3/02; Y10S 464/906
USPC ................. 464/7, 15, 173–175, 904–906, 17; 403/50, 51; 277/634–636; 74/18–18.2
See application file for complete search history.

(56) References Cited

U.S. PATENT DOCUMENTS

| | | | |
|---|---|---|---|
| 3,942,336 A | 3/1976 | Schultenkamper | |
| 4,224,808 A * | 9/1980 | Gehrke | 464/175 |
| 4,282,722 A | 8/1981 | Orain | |
| 4,392,838 A * | 7/1983 | Welschof et al. | 464/175 |
| 4,559,025 A * | 12/1985 | Dore | 464/175 |
| 5,308,284 A | 5/1994 | Renzo et al. | |
| 5,765,837 A | 6/1998 | Schwarzler | |
| 6,179,717 B1 * | 1/2001 | Schwarzler | 464/175 |
| 6,203,024 B1 | 3/2001 | Liebich et al. | |
| 6,406,034 B1 | 6/2002 | Alcantara et al. | |

(Continued)

FOREIGN PATENT DOCUMENTS

| | | | |
|---|---|---|---|
| DE | 4323686 | * | 2/1995 |
| DE | 4323686 C2 | | 7/1995 |

(Continued)

*Primary Examiner* — Gregory Binda
*Assistant Examiner* — Josh Skroupa
(74) *Attorney, Agent, or Firm* — Marshall & Melhorn, LLC

(57) ABSTRACT

A shaft assembly includes a first shaft. The first shaft has a first annular crest and a second annular crest. The first annular crest and the second annular crest are separated by an inclined surface. The second annular crest includes an axially extending surface attached to an end of the inclined surface. A boot is secured to the shaft. The boot includes a channel and a diaphragm portion disposed adjacent an end of the channel. The channel includes an inlet portion, a partially helical portion, and an outlet portion formed in an inner surface of the boot. The diaphragm portion is provided over the inclined surface and includes a lip which contacts the second annular crest.

21 Claims, 7 Drawing Sheets

(56) References Cited

U.S. PATENT DOCUMENTS

| | | | |
|---|---|---|---|
| 6,793,584 B2 * | 9/2004 | Ramey et al. | 464/175 |
| 6,820,876 B2 | 11/2004 | Iwano | |
| 7,063,331 B2 * | 6/2006 | Iwano | 277/634 |
| 7,229,356 B2 | 6/2007 | Iwano | |
| 7,677,982 B2 | 3/2010 | Campau et al. | |
| 2003/0207714 A1 | 11/2003 | Ramey et al. | |
| 2004/0007832 A1 | 1/2004 | Iwano | |

FOREIGN PATENT DOCUMENTS

| | | |
|---|---|---|
| GB | 2296946 B2 | 4/1998 |
| JP | 61-044029 U | 3/1986 |
| JP | 61-117921 U | 7/1986 |
| JP | 61-128423 U | 8/1986 |
| JP | 61-135027 U | 8/1986 |
| JP | 62-043869 U | 3/1987 |
| JP | 62-049077 A | 3/1987 |
| JP | 62-091028 U | 6/1987 |
| JP | 63-036725 U | 3/1988 |
| JP | 64-032931 U | 3/1989 |
| JP | 01-017728 Y2 | 5/1989 |
| JP | 01-073526 U | 5/1989 |
| JP | 01-100930 U | 7/1989 |
| JP | 02-28276 Y2 | 7/1990 |
| JP | 02-085024 U | 7/1990 |
| JP | 02-134323 U | 11/1990 |
| JP | 03-01357 U | 1/1991 |
| JP | 03-99684 U1 | 10/1991 |
| JP | 03-99685 U1 | 10/1991 |
| JP | 04-003129 U | 1/1992 |
| JP | 04-010126 U | 1/1992 |
| JP | 04-014820 U | 2/1992 |
| JP | 05-022859 U | 3/1993 |
| JP | 05-042837 U | 6/1993 |
| JP | 05-089965 U | 12/1993 |
| JP | 06-185532 A | 7/1994 |
| JP | 07-044969 U | 12/1995 |
| JP | 11-280782 A | 10/1999 |
| JP | 2001-280513 A | 10/2001 |
| JP | 2003-097710 A | 4/2003 |
| JP | 2003-097731 A | 4/2003 |
| JP | 3435178 B2 | 5/2003 |
| JP | 2005-090608 A | 4/2005 |
| JP | 2005-127442 A | 5/2005 |
| JP | 2005-133803 A | 5/2005 |
| JP | 2006-275195 A | 10/2006 |
| JP | 2006-275241 A | 10/2006 |
| JP | 2006-275259 A | 10/2006 |
| JP | 2006-308075 A | 11/2006 |
| JP | 2006-349010 A | 12/2006 |
| JP | 2007-032643 A | 2/2007 |
| JP | 2007-064321 A | 3/2007 |
| JP | 2007-508508 A | 4/2007 |
| JP | 2007-113616 A | 5/2007 |
| JP | 2007-247845 A | 9/2007 |
| JP | 2008-002642 A | 1/2008 |
| JP | 4079633 B2 | 2/2008 |
| JP | 4090800 B2 | 3/2008 |
| JP | 4090801 B2 | 3/2008 |
| JP | 2008-144810 A | 6/2008 |
| JP | 4136699 B2 | 6/2008 |
| JP | 2008-151262 A | 7/2008 |
| JP | 2008-202667 A | 9/2008 |
| JP | 2008-215517 A | 9/2008 |
| JP | 2008-248969 A | 10/2008 |
| JP | 2008-256175 A | 10/2008 |
| JP | 4202092 B2 | 10/2008 |
| JP | 2008-275133 A | 11/2008 |
| JP | 2008-298271 A | 12/2008 |
| JP | 2008-303945 A | 12/2008 |
| JP | 2009-092098 A | 4/2009 |

* cited by examiner

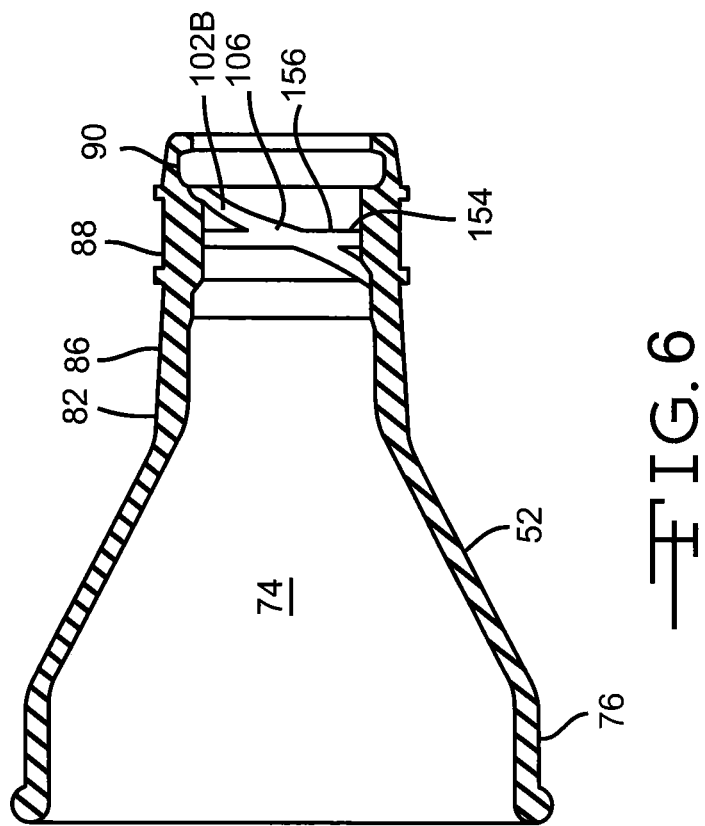
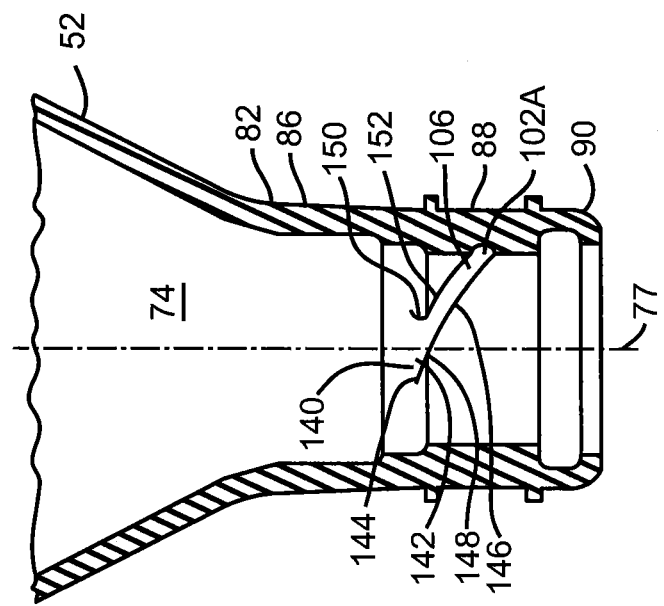

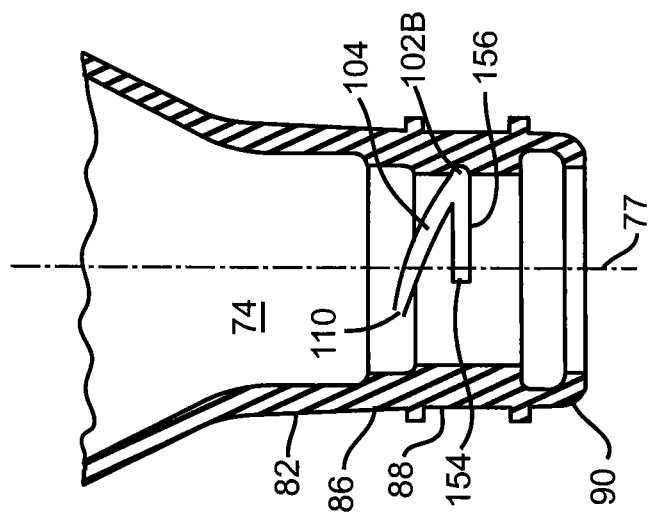
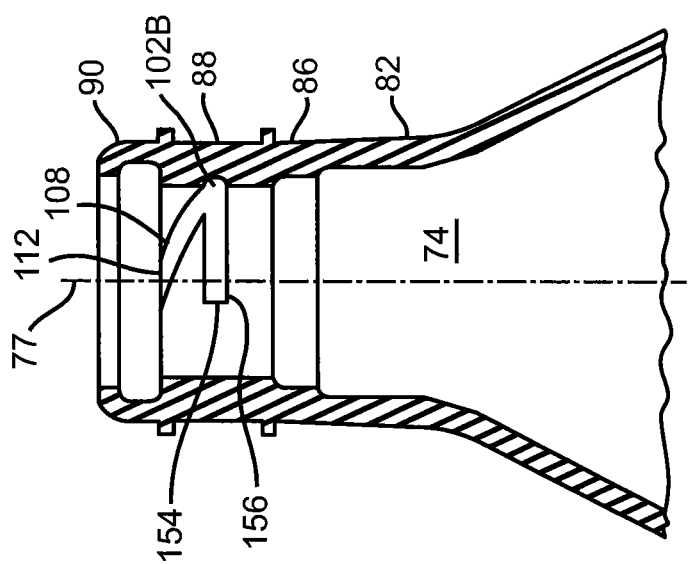

SHAFT ASSEMBLY FOR A CONSTANT VELOCITY JOINT

CROSS-REFERENCE TO RELATED APPLICATION

This application is claiming the benefit, under 35 U.S.C. 119(e), of the provisional application which was granted Ser. No. 61/610,676 filed on Mar. 14, 2012, the entire disclosure of which is hereby incorporated by reference.

BACKGROUND OF THE INVENTION

The invention relates to a shaft assembly which allows pressurized gases from a constant velocity joint to be vented. More specifically, the invention relates to a shaft assembly which allows pressurized gases in a space adjacent the constant velocity joint to be vented to the atmosphere.

Boots and assemblies for venting the pressurized gases which are generated from the rotation and/or plunging of a constant velocity joint are known. However, the boots and assemblies known in the art either allow too much lubricant loss or do not provide robust venting. Therefore, it is desired to provide an improved assembly which minimizes lubricant loss, vents efficiently, and protects the constant velocity joint from contaminants.

BRIEF SUMMARY OF THE INVENTION

In an embodiment, a shaft assembly is provided. The shaft assembly comprises a first shaft. The first shaft comprises a first annular crest and a second annular crest. The first annular crest and the second annular crest are separated by an inclined surface. The second annular crest comprises an axially extending surface attached to an end of the inclined surface. A boot is secured to the shaft. The boot comprises a channel and a diaphragm portion disposed adjacent an end of the channel. The channel comprises an inlet portion, a partially helical portion, and an outlet portion formed in an inner surface of the boot. The diaphragm portion is provided over the inclined surface and comprises a lip which contacts the second annular crest.

In another embodiment, the shaft assembly comprises a first shaft. The first shaft comprises a first annular crest and a second annular crest. The first annular crest and the second annular crest are separated by a first axial surface and an inclined surface. The second annular crest comprises an axially extending surface attached to an end of the inclined surface. A boot is secured to the shaft between the first annular crest and the second annular crest by a boot band assembly. The boot comprises a channel and a diaphragm portion disposed adjacent an end of the channel. The channel comprises an inlet portion, a partially helical portion, and an outlet portion formed in an inner surface of the boot. The channel turns about a longitudinal axis of the boot such that the inlet portion and outlet portion are oblique to a longitudinal axis of the boot. The diaphragm portion is provided over the inclined surface and comprises a lip which continuously contacts the second annular crest. A gap is provided between the inclined surface and the diaphragm portion.

BRIEF DESCRIPTION OF THE DRAWINGS

The above, as well as other advantages of the present invention will become readily apparent to those skilled in the art from the following detailed description when considered in the light of the accompanying drawings in which:

FIG. 5A a partial cross-sectional view depicting an embodiment of the boot of FIG. 2 taken along line 5A-5A;

FIG. 6 is a cross-sectional view depicting an embodiment of the boot of FIG. 2 taken along line 6-6;

FIG. 7 is a partial cross-sectional view depicting an embodiment of the boot of FIG. 2 taken along line 7-7;

FIG. 8 is a partial cross-sectional view depicting an embodiment of the boot of FIG. 2 taken along line 8-8.

DETAILED DESCRIPTION OF THE INVENTION

Figure 1:
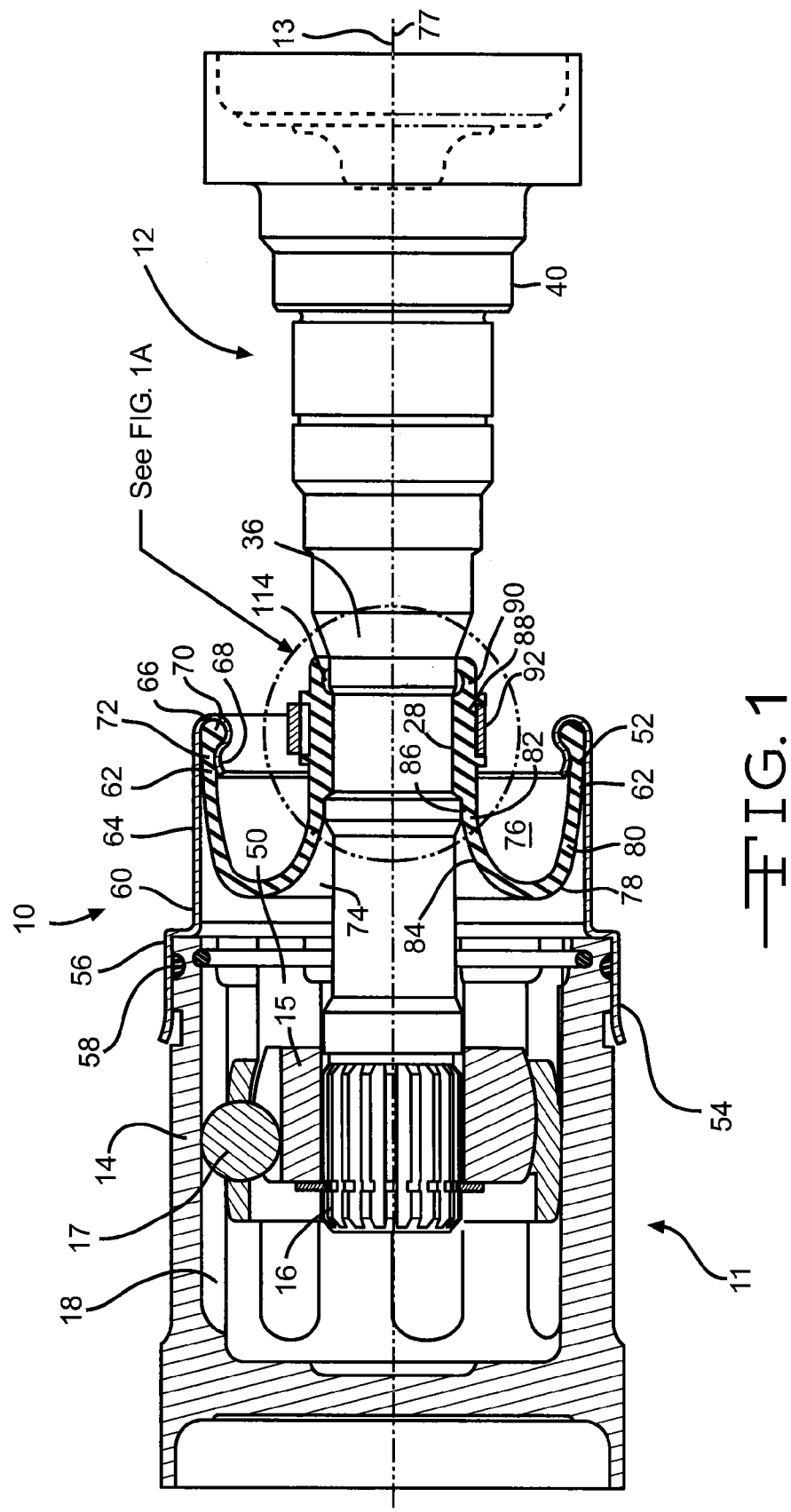
FIG. 1 is a cross-sectional view depicting an embodiment of the assembly, where a shaft is shown in phantom lines, in accordance with the invention.

It is to be understood that the invention may assume various alternative orientations and step sequences, except where expressly specified to the contrary. It is also to be understood that the specific articles, assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Referring now to the drawings, there is illustrated in FIG. 1 a shaft assembly 10 for venting pressure generated from a constant velocity joint 11 (hereinafter also referred to as the "assembly"). The assembly 10 will be described in connection with a constant velocity joint for a vehicle (not depicted). It would be understood by one of ordinary skill in the art that the assembly and method of venting described herein may have applications to on-highway and off-highway vehicles. Furthermore, it would be understood by one of ordinary skill in the art that the present invention could have industrial, locomotive, and aerospace applications.

The constant velocity joint 11 has an outer element 14 which is connected to a second shaft (not depicted) and an inner element 15 which is formed at a front end portion 16 of a first shaft 12. As used herein, the terms "radial", "radially", "axial" and "axially" will refer to the orientation of certain elements which could be utilized in assembly 10 with respect to a longitudinal axis 13 of the first shaft 12 unless otherwise stated. The constant velocity joint 11 is constructed in such a manner that a ball 17 is fitted in grooves 18 which are disposed between the inner element 15 and the outer element 14. However, it should be appreciated that any type of constant velocity joint may be utilized in practicing the invention described herein.

Figure 9:
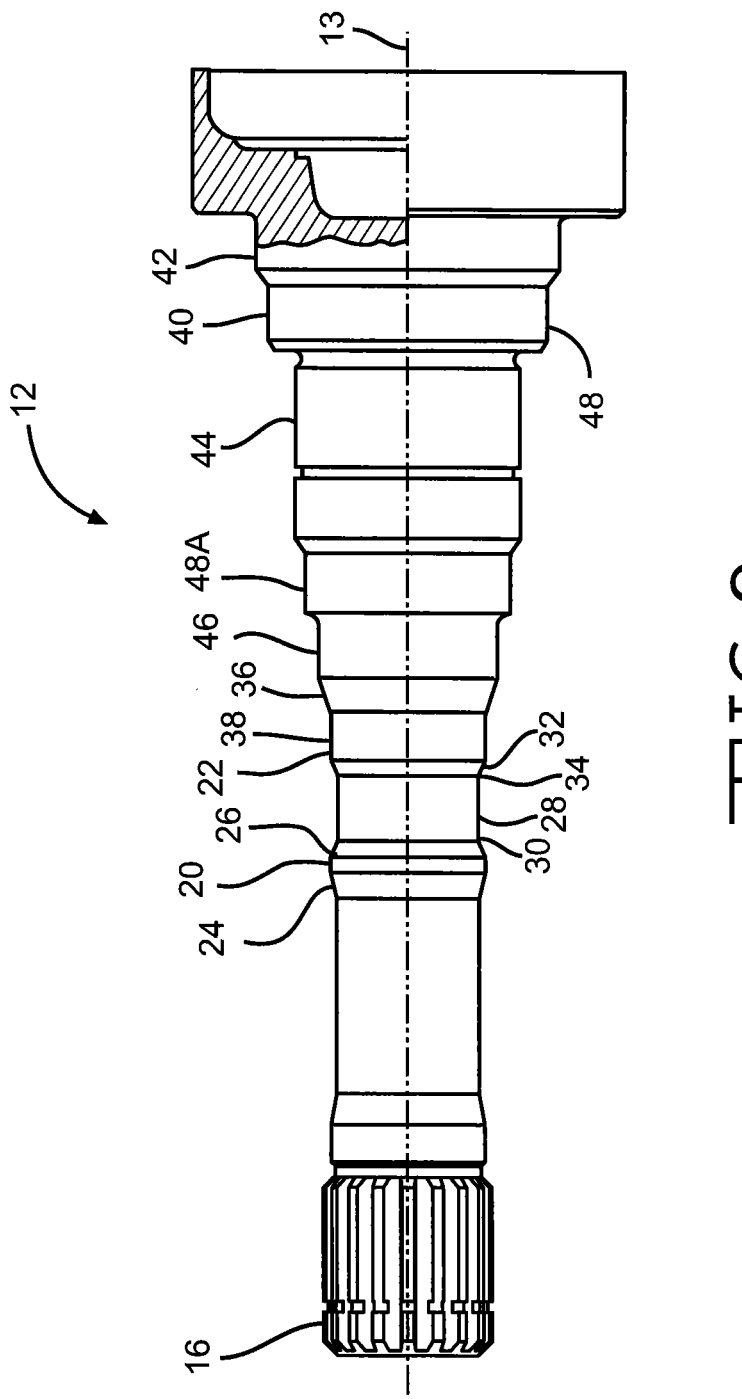
FIG. 9 is a view of an embodiment of the shaft of the assembly of FIG. 1 partially sectioned.

The assembly 10 comprises the first shaft 12. The first shaft is attached to the constant velocity joint 11. Referring now to FIG. 9, the first shaft 12 comprises a first annular crest 20 and a second annular crest 22. The first annular crest 20 is connected to the first shaft 12 by a first inner inclined surface 24 on one side thereof and a second inner inclined surface 26 on another side thereof. In an embodiment, at least a portion of the first inner inclined surface 24 and the second inner inclined surface 26 is formed at an acute angle with respect to the longitudinal axis 13 of the first shaft 12.

A first axial surface 28 is provided between the first annular crest 20 and the second annular crest 22. Thus, the first axial surface 28 separates the second annular crest 22 from the first annular crest 20. The first axial surface 28 is attached to the second inner inclined surface 26 on one end 30 and an outer inclined surface 32 on another end 34. In an embodiment, the first axial surface 28 is of an axial length which is greater than an axial length of the first annular crest 20.

The outer inclined surface 32 may be formed with either a concave or a convex shaped portion. However, the outer inclined surface 32 is preferably formed as a linear section. Preferably, in these embodiments, at least a portion of the outer inclined surface 32 is formed at an acute angle with respect to the longitudinal axis 13 of the first shaft 12.

The outer inclined surface 32 is attached to and also separates the second annular crest 22 from the first annular crest 20. The second annular crest 22 includes an axially extending surface (hereinafter referred to also as the "second axial surface 38"). On an end, the second axial surface 38 is attached to an end of the outer inclined surface 32. On an opposite end, the second axial surface 38 attaches the second annular crest 22 to a middle portion 36 of the first shaft 12.

The first shaft 12 may decrease in diameter from a back end portion 40 to the middle portion 36. Preferably, the back end portion 40 decreases in diameter from a large diameter portion 42 to a middle diameter portion 44 and further decreases in diameter to a small diameter portion 46. In certain embodiments, intermediate diameter portions 48, 48A are positioned between the large diameter portion 42 and the middle diameter portion 44 and/or the middle diameter portion 44 and the small diameter portion 46. Also, in certain embodiments, the first shaft 12 is rotatably supported by a supporting member (not depicted) via a center bearing (not depicted) which is mounted in the middle diameter portion 44.

Referring back to FIG. 1, a space 50 is provided between the inner element 15 and the outer element 14. Grease or another suitable lubricant is disposed within the space 50 to lubricate the ball 17 and thus improve its slidability and increase its useful life. The assembly 10 comprises a boot 52 and may comprise a boot adapter 54. The boot 52 and the boot adapter 54 are provided to enclose the space 50 to prevent contaminants from entering the space 50 and the lubricant from escaping therefrom.

The boot adapter 54 is preferably made from a thin metal sheet and is attached to the outer element 14 at a first end portion 56. The first end portion 56 may have a substantially cylindrical shape and is preferably provided over a seal member 58 located near an end of the outer element 14. The seal member 58 is provided about the periphery of the outer element 14 and may be an O-ring or the like.

The boot adapter 54 also comprises a second end portion 60. The second end portion 60 contacts and is attached to the boot 52 at a connecting portion 62. The second end portion 60 may have a substantially cylindrical shape. In an embodiment, the second end portion 60 comprises a base portion 64 attached to a rounded portion 66. In this embodiment, the second end portion 60 is folded such that certain portions of the rounded portion 66 overlap each other. The rounded portion 66 may be attached to a bead portion 68. As shown in FIG. 1, the base portion 64, the rounded portion 66 and the bead portion 68 may contact the connecting portion 62 of the boot 52.

The connecting portion 62 of the boot 52 is attached to the base portion 64, the rounded portion 66 and, when provided, the bead portion 68 of the boot adapter 54. In an embodiment, the boot 52 is made of an elastomeric material. Thus, the connecting portion 62 may be compressed between the base portion 64 and the rounded portion 66 and/or the bead portion 68 to attach the boot adapter 54 and the boot 52 to each other. In these embodiments, the connecting portion 62 may comprise a flange portion 70. In certain embodiments, the flange portion 70 has a rounded end. Also, in certain embodiments, the flange portion 70 is of a thickness which is greater than an adjacent section 72 of the connecting portion 62 and may extend annularly about the first shaft 12.

The boot 52 comprises an inner surface 74 and an outer surface 76. When attached to the boot adapter 54 and first shaft 12, certain portions of the inner surface 74 are adjacent the space 50 and certain portions contact the first shaft 12. The outer surface 76 is exposed to the atmosphere. The boot 52 has a longitudinal axis 77 which is aligned with the longitudinal axis 13 of the first shaft 12. The boot 52 and the first shaft 12 are concentric.

When attached to the boot adapter 54 and the first shaft 12, the boot 52 comprises an annular fold 78. The annular fold 78 is attached to the connecting portion 62 on one end 80. The boot 52 also comprises a collar 82. The collar 82 is attached to another end 84 of the annular fold 78. The collar 82 comprises a neck portion 86, a fitted portion 88 and a diaphragm portion 90. The neck portion 86 is attached the fitted portion 88 and the fitted portion 88 is attached to the diaphragm portion 90. Preferably, the thickness of the fitted portion 88 is greater than the thickness of the neck portion 86 and the diaphragm portion 90.

Figure 1A:
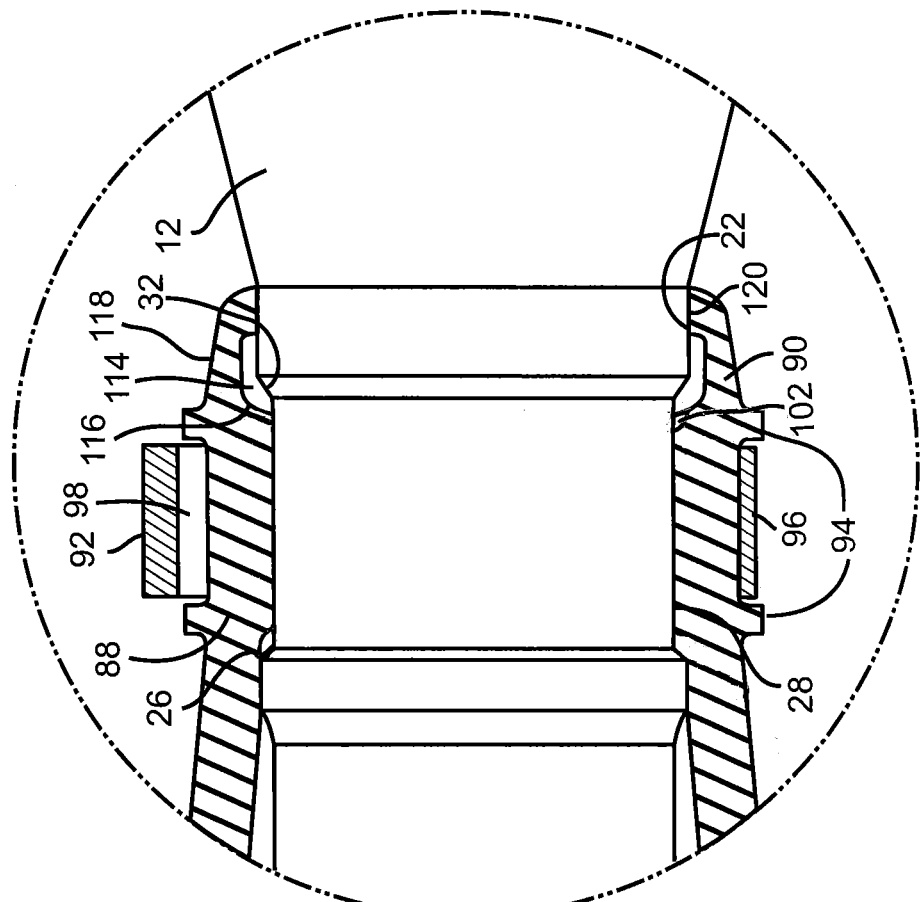
FIG. 1A is an enlarged cross-sectional view depicting a portion of the assembly of FIG. 1.

As illustrated best in FIG. 1A, the fitted portion 88 is positioned between the second inner inclined surface 26 and the outer inclined surface 32 and contacts the first axial surface 28. The assembly 10 may comprise a boot band assembly 92 for securing the boot 52 to the first shaft 12. Preferably, the boot 52 is permanently secured to the first shaft 12. When the boot 52 is secured to the first shaft 12, it is preferred that the boot 52 does not move axially along the first shaft 12.

The boot 52 is secured to the first shaft 12 between the first annular crest 20 and the second annular crest 22. Preferably, the fitted portion 88 is attached to the first shaft 12 by the boot band assembly 92. In an embodiment, the boot 52 comprises a pair of annular projections 94 on its outer surface 76. The annular projections 94 are provided to ensure that the boot band assembly 92 is located about the fitted portion 88.

The boot band assembly 92 may comprise a band section 96 and one or more ears 98. Preferably, the band section 96 is located annularly about the fitted portion 88. The one or more ears 98 can be crimped to adjust the circumference of the band section 96 and thus secure the boot 52 to the first shaft 12.

FIGS. 2-8 depict the boot 52 when it is not attached to the boot adapter 54 or the first shaft 12 and will be utilized to describe various features thereof. As illustrated, the boot 52 tapers from a big diameter portion 100 to the collar 82 and is generally funnel-shaped.

The boot 52 comprises a channel 102 formed in its inner surface 74. The channel 102 is in fluid communication with the space 50. In an embodiment, the channel 102 is formed in predetermined portions of the collar 82. Preferably, the channel 102 is formed in the fitted portion 88 and extends therethrough. Also, the channel 102 may be formed in a portion of the neck portion 86.

The channel 102 comprises an inlet portion 104, a partially helical portion 106 and an outlet portion 108. The inlet portion 104 is attached to the partially helical portion 106 and the partially helical portion 106 is attached to the outlet portion 108. The channel 102 also comprises an inlet opening 110 provided at an end of the channel 102 and an outlet opening 112 provided at an opposite end of the channel 102. The inlet opening 110 is attached to the inlet portion 104 and the outlet opening 112 is attached to the outlet portion 108. In an embodiment, the inlet opening 110, inlet portion 104, partially helical portion 106, outlet portion 108 and outlet opening 112 are contiguous.

Preferably, the channel 102 is formed as a single continuous channel. It should be appreciated that forming the channel 102 in such a manner is advantageous over known channel designs. Preferably, the channel 102 is defined by the inner surface 74 of the boot 52 such that it does not comprise joints or interfaces with seams which might create areas of the channel 102 which are susceptible to blockage. In an embodiment, the inlet opening 110, outlet opening 112 and the portions 104, 106, 108 of the channel 102 are formed by molding.

The partially helical portion 106 is oriented in a manner such that it is oblique to a longitudinal axis 77 of the boot 52. The partially helical portion 106 is in fluid communication with the inlet portion 104 and the outlet portion 108. In certain embodiments, the partially helical portion 106 has a substantially constant width and extends circumferentially about the fitted portion 88.

Figure 4:
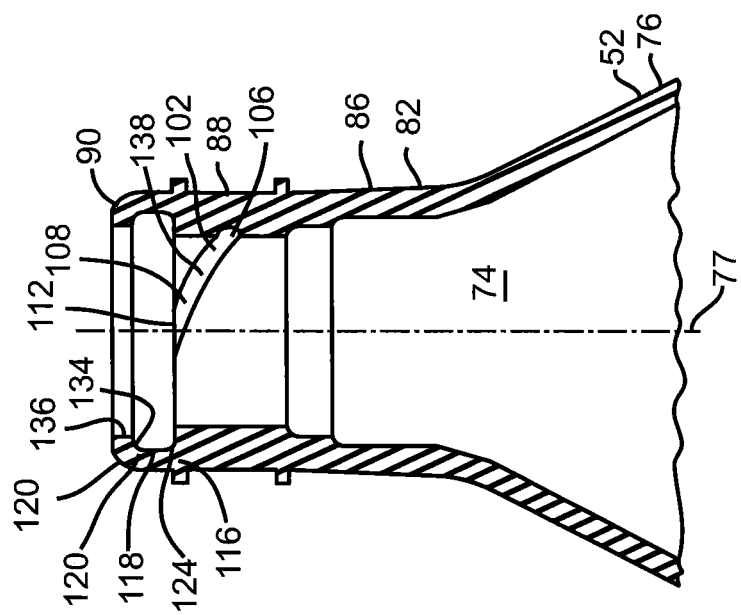
FIG. 4 is a partial cross-sectional view depicting an embodiment of the boot of FIG. 2 taken along line 4-4.

Referring now to FIG. 4, the outlet portion 108 is oriented in a manner such that it is oblique to a longitudinal axis 77 of the boot 52. When the assembly 10 is formed, the outlet opening 112 is in fluid communication with a gap 114. The gap 114 is provided between the outer inclined surface 32 and an end of the fitted portion 88. Also, the gap 114 is provided between the outer inclined surface 32 and the diaphragm portion 90. Additionally, the gap 114 may be provided between the diaphragm portion 90 and a portion of the second annular crest 32.

Figure 5:
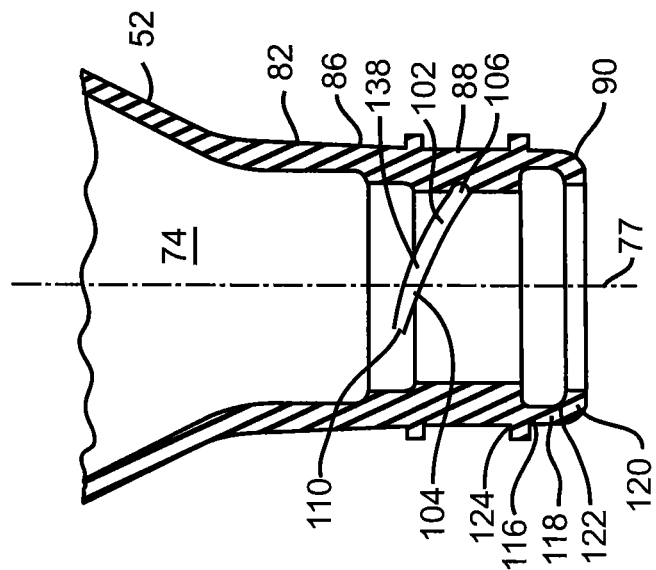
FIG. 5 is a partial cross-sectional view depicting an embodiment of the boot of FIG. 2 taken along line 5-5.

The inlet opening 110 and inlet portion 104 are shown best in FIG. 5. As illustrated, the inlet portion 104 is oriented in a manner such that it is oblique to the longitudinal axis 77 of the boot 52. When the assembly 10 is formed, the inlet opening 110 provides fluid communication between the space 50 and the channel 102.

Figure 3:
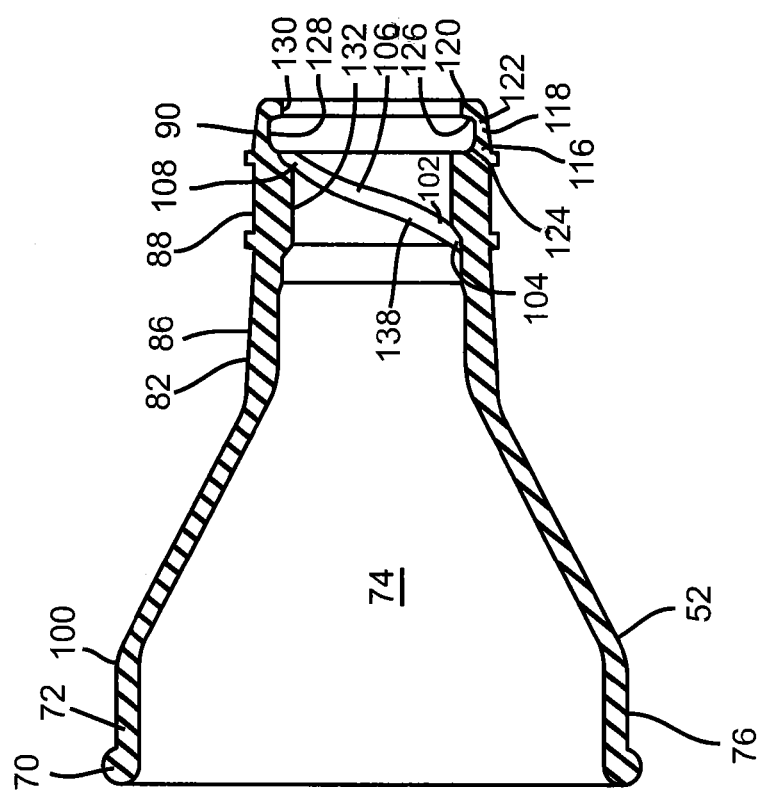
FIG. 3 is a cross-sectional view depicting an embodiment of the boot of FIG. 2 taken along line 3-3.
Figure 2:
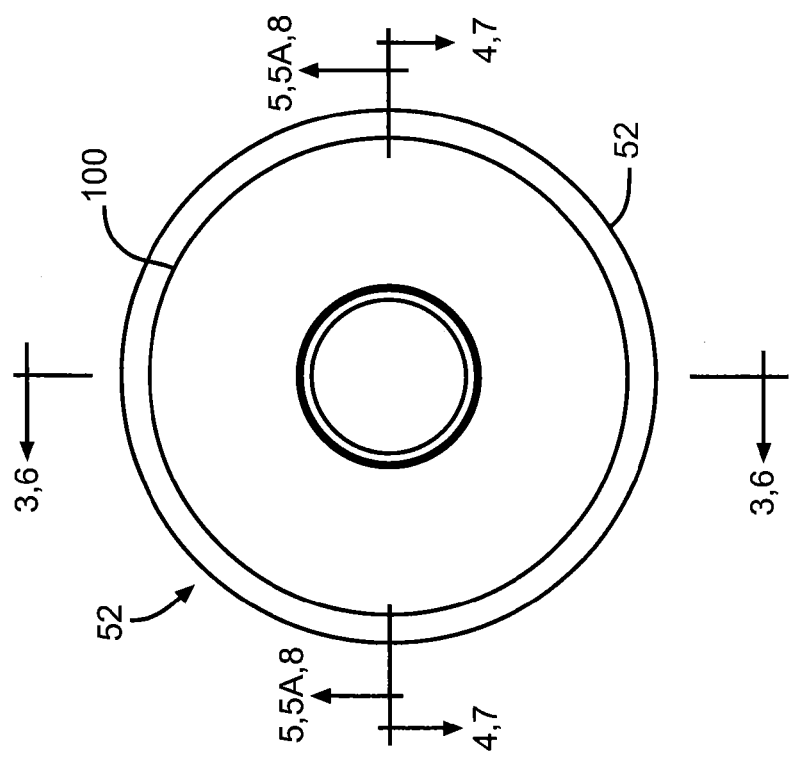
FIG. 2 is a front view of an embodiment of a boot for use in the assembly of FIG. 1.

As illustrated best in FIGS. 3-5, the channel 102 is of a length and turns about the longitudinal axis 77 of the boot 52. Preferably, the channel 102 makes less than a full turn about the longitudinal axis 77 of the boot 52. However, in certain embodiments, the channel 102 makes at least half of a turn about the longitudinal axis 77 of the boot 52 but less than a full turn. Preferably, the channel 102 makes about half of a turn about the longitudinal axis 77 of the boot 52. In other embodiments (not depicted), the channel 102 makes less than half of a turn about the longitudinal axis 77 of the boot 52. In these embodiments, the effective length of the channel 102 is reduced as compared to known channels. This feature allows for the efficient and gradual venting of pressurized gases, minimizes lubricant loss and provides a channel 102 which is cheaper and easier to manufacture.

The diaphragm portion 90 is disposed adjacent an end of the channel 102 proximate the outlet opening 112. The diaphragm portion 90 is provided over the outer inclined surface 32 and the second annular crest 22. As best shown in FIGS. 3-5, the diaphragm portion 90 comprises a first fillet portion 116, an annular portion 118, and a lip 120. The diaphragm portion 90 may also comprise a second fillet portion 122. The fitted portion 88 is attached to the first fillet portion 116. The first fillet portion 116 comprises a fillet 124 provided on the inner surface 74 of the boot 52. The first fillet portion 116 is attached to the annular portion 118. The annular portion 118 is attached to the lip 120 or the second fillet portion 122, when provided. Thus, when provided, the second fillet portion 122 is attached to the lip 120 and comprises a fillet 124 on the inner surface 74 of the boot 52. The second fillet portion 122 comprises a fillet 126 provided on the inner surface 74 of the boot 52.

As best shown in FIG. 3, in certain embodiments, the first fillet portion 116 has a thickness which is greater than the thickness of the annular portion 118. Also, in an embodiment, a diameter 128 of the annular portion 118 is greater than a diameter 130 of the lip 120. In these embodiments, the diameter 130 of the lip 120 is greater than a diameter 132 of the fitted portion 88.

Referring back to FIG. 1A, the first fillet portion 116 does not contact the outer inclined surface 32. Additionally, the annular portion 118 does not contact the second annular crest 22. Preferably, the lip 120 is press fit on the second annular crest 32 such that the lip 120 continuously contacts the second annular crest 22. Referring now to FIG. 4, in an embodiment, the lip 120 comprises a first radial surface 134 and a sealing surface 136. The sealing surface 136 contacts the second annular crest 22 to provide a seal between the lip 120 and the second annular crest 22.

The lip 120 contacts the second annular crest 22 to provide a resilient seal. The seal is resilient preventing contaminants from entering the boot 52 and lubricant from escaping but allowing pressure in the space 50 to be vented to the atmosphere under certain conditions. In an embodiment, the seal is selectively formed between the lip 120 contacts the second annular crest 22.

As above-described, pressure is generated within the space 50. When the pressure in the space 50 reaches a certain value and/or the difference between the pressure in the space 50 and the atmosphere is too great, the pressurized gases, i.e. gases which are pressurized above normal atmospheric pressure, are vented to the atmosphere. In order for pressure to be vented, a pathway 138 for venting pressure is provided through the assembly 10. As should be appreciated, the pathway 138 is provided not only so that pressure can be relieved from the space 50 but also so that contaminants cannot enter the space 50 and lubricant cannot escape therefrom.

The pathway 138 comprises the channel 102. Preferably, the channel 102 turns about portions of the first shaft 12 in a continuous unbroken manner. During venting, the pressurized gases flow from the space 50 through the inlet opening 110, the inlet portion 104 and the partially helical portion 106. The pressurized gases also flow through the outlet portion 108 and the outlet opening 112.

The pathway 138 also comprises the gap 114. As best shown in FIG. 1A, the end of the fitted portion 88 is adjacent the outer inclined surface 32 but does not contact the outer inclined surface 32. Additionally, the diaphragm portion 90 does not contact the outer inclined surface 32. Thus, the gap 114 is provided between the fitted and diaphragm portions 88, 90 and the outer inclined surface 32. The space 50 between the constant velocity joint 11 and the boot 52 is in fluid communication with the channel 102 through the inlet opening 110 and the channel 102 is in fluid communication with the gap 114 through the outlet opening 112. During venting, the pressurized gases flow through the outlet opening 112 and into the gap 114.

The pressurized gases are expelled to the atmosphere through the pathway 138 and about the lip 120. Thus, the pathway 138 also comprises the selectively formed seal between the lip 120 and the second annular crest 22. During venting, the pressurized gases flow through the gap 114 and past the lip 120. After the pressure is vented from the space 50 and returned to a certain value, the seal between the lip 120 and the second annular crest 22 is restored which stops the flow of gases past the lip 120.

FIG. 5A illustrates additional embodiments of a channel 102A suitable for use in the shaft assembly 10. The embodiments illustrated in FIG. 5A may be utilized in the assembly 10 in place of or in combination with the aforementioned embodiments of the channel 102.

As depicted in FIG. 5A, the channel 102A comprises an inlet opening 140, inlet portion 142 and partially helical portion 106. The inlet opening 140 is attached to the inlet portion 142 and the inlet portion 142 is attached to the partially helical portion 106. Preferably, the inlet opening 140 has a width 144 which is greater than a width 146 of the partially helical portion 106. Also, preferably, the inlet portion 142 has a width 148 which is greater than the width 146 of the partially helical portion 106.

The width 144 of the inlet opening 140 may taper to the inlet portion 142. The width 144 of the inlet portion 142 may taper to the partially helical portion 106. Preferably, the width 144 of the inlet opening 140 is greater than the width 146 of the partially helical portion 106 and tapers to the inlet portion 142. In this embodiment, the inlet opening 140 may comprise a radius 150 which is formed on at least one side 152 of the inlet opening 140. As illustrated, the channel 102A may be of a funnel-like or conoid-like shape in cross-section.

The above-described embodiments may provide further advantages over the known designs. For example, when the inlet opening 140 and/or inlet portion 142 are wider than other portions 106, 108 of the channel 102A, the inlet opening 140 is less likely to be blocked by lubricant or the like. Thus, pressure relief may be achieved more quickly and in a more gradual manner. Additionally, providing the radius 150 on the inlet opening 140 may increase the ease in which the boot 52 is manufactured when compared with a boot having a channel which comprises an inlet opening having having sharp corners.

FIGS. 6-8 depict additional embodiments of a channel 102B suitable for use in the shaft assembly 10. The embodiments illustrated in FIGS. 6-8 may be utilized in the assembly 10 in place of or in combination with the aforementioned embodiments of the channel 102, 102A.

As depicted in FIGS. 6-8, the channel 1026 comprises the inlet opening 110, inlet portion 104, partially helical portion 106, outlet portion 108, and the outlet opening 112. The inlet opening 110 is attached to the inlet portion 104, the inlet portion 104 is attached to the partially helical portion 106, the partially helical portion 106 is attached to the outlet portion 108, and the outlet portion 108 is attached to the outlet opening 112. In this embodiment, the channel 1028 also comprises a semi-annular portion 154 attached to and in fluid communication with the partially helical portion 106. It should be appreciated that in other embodiments, the semi-annular portion 154 may be attached to and in fluid communication with the inlet portion 104 or the outlet portion 108. The semi-annular portion 154 may be formed utilizing a mold.

The semi-annular portion 154 is formed in the inner surface 74 of the boot 52. Preferably, the semi-annular portion 154 has a substantially constant width 156. In an embodiment, the semi-annular portion 154 radially about the fitted portion 88. Preferably, the semi-annular portion 154 extends in an arc of more than one hundred and eighty degrees on the inner surface 74 of the boot 52. In an embodiment, the semi-annular portion 154 extends in an arc which is less than a two hundred and seventy degrees. In other embodiments (not depicted), the semi-annular portion 154 extends in an arc which is less than a one hundred and eighty degrees on the inner surface 74 of the boot 52.

As above-noted, the boot 52 is permanently secured to the first shaft 12 so that it remains attached to and does not move axially along the shaft 12. During attachment of the boot 52, certain portions of the channel may be compressed such that portions of the channel become closed. Thus, utilizing the semi-annular portion 154 may provide an additional path for pressurized gases to flow through when portions of the channel 102B are closed or at least partially closed.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What is claimed is:

1. A shaft assembly, comprising;
   a first shaft which comprises a first annular crest and a second annular crest, the first annular crest and the second annular crest are separated by an inclined surface, wherein the second annular crest comprises an axially extending surface attached to an end of the inclined surface;
   a boot secured to the shaft, wherein the boot comprises a channel which comprises an inlet portion, a partially helical portion, and an outlet portion formed in an inner surface of the boot and a diaphragm portion disposed adjacent an end of the channel;
   wherein the diaphragm portion is provided over the inclined surface and comprises a lip which contacts the second annular crest to provide a selectively formed seal around an entire circumference of the second annular crest.

2. The shaft assembly defined by claim 1, further comprising a gap provided between the inclined surface and the diaphragm, wherein the gap is in fluid communication with an outlet opening provided at an end of the channel.

3. The shaft assembly defined by claim 2, wherein the gap is provided between a portion of the second annular crest and the diaphragm.

4. The shaft assembly defined by claim 3, wherein the channel is formed in a fitted portion of the boot and the gap is provided between an end of the fitted portion and the inclined surface.

5. The shaft assembly defined by claim 1, further comprising a first axial surface provided between the first annular crest and the second annular crest which is attached on one end to the inclined surface.

6. The shaft assembly defined by claim 1, wherein a diameter of the lip is greater than a diameter of a fitted portion.

7. The shaft assembly defined by claim 1, wherein the lip continuously contacts the second annular crest.

8. The shaft assembly defined by claim 1, wherein the channel turns about a longitudinal axis of the boot.

9. The shaft assembly defined by claim 1, wherein the diaphragm portion also comprises a fillet portion which is attached to a fitted portion of the boot.

10. The shaft assembly defined by claim 1, wherein the channel makes less than a full turn about a longitudinal axis of the boot.

11. The shaft assembly defined by claim 1, wherein the channel makes at least half of a turn about a longitudinal axis of the boot.

12. The shaft assembly defined by claim 1, wherein the channel makes about half of a turn about a longitudinal axis of the boot.

13. The shaft assembly defined by claim 1, wherein the channel makes less than half of a turn about a longitudinal axis of the boot.

14. The shaft assembly defined by claim 1, wherein the inlet portion is oblique to a longitudinal axis of the boot.

15. The shaft assembly defined by claim 1, wherein the outlet portion is oblique to a longitudinal axis of the boot.

16. The shaft assembly defined by claim 1, wherein the channel extends through a fitted portion of the boot.

17. The shaft assembly defined by claim 1, wherein the boot is secured to the first shaft between the first annular crest and the second annular crest by a boot band assembly.

18. The shaft assembly defined by claim 1, wherein a circumferential gap is provided between the inclined surface and the diaphragm portion.

19. The shaft assembly defined by claim 1, wherein the lip comprises a sealing surface which contacts the second annular crest to provide a seal between the lip and the second annular crest.

20. A shaft assembly, comprising:
a first shaft which comprises a first annular crest and a second annular crest, the first annular crest and the second annular crest are separated by a first axial surface and an inclined surface, wherein the second annular crest comprises an axially extending surface attached to an end of the inclined surface;
a boot secured to the shaft between the first annular crest and the second annular crest by a boot band assembly, wherein the boot comprises a channel which comprises an inlet portion, a partially helical portion, and an outlet portion formed in an inner surface of the boot, wherein the channel turns about a longitudinal axis of the boot such that the inlet portion and outlet portion are oblique to a longitudinal axis of the boot, and a diaphragm portion disposed adjacent an end of the channel;
wherein the diaphragm portion is provided over the inclined surface and comprises a lip which continuously contacts the second annular crest to provide a selectively formed seal around an entire circumference of the second annular crest, and a gap is provided between the inclined surface and the diaphragm portion.

21. The shaft assembly defined by claim 20, wherein the channel is in fluid communication with a space provided between an inner element and an outer element of a constant velocity joint.

* * * * *